United States Patent [19]
Jardine et al.

[11] Patent Number: 5,826,066
[45] Date of Patent: Oct. 20, 1998

[54] METHOD FOR KEEPING ACCURATE TIME IN A COMPUTER SYSTEM

[75] Inventors: Robert L. Jardine, Cupertino; Hossein Moiin, San Francisco, both of Calif.

[73] Assignee: Tandem Computers Incorporated, Cupertino, Calif.

[21] Appl. No.: 694,073

[22] Filed: Aug. 8, 1996

[51] Int. Cl.$^6$ .................... G06F 1/04; G06F 1/14
[52] U.S. Cl. ............................ 395/551; 395/558
[58] Field of Search ................... 395/551, 555, 395/557, 558, 559, 750.04, 182.1; 364/145

[56] References Cited

U.S. PATENT DOCUMENTS

| | | | |
|---|---|---|---|
| 4,575,848 | 3/1986 | Moore et al. | 371/61 |
| 4,746,920 | 5/1988 | Nellen et al. | 340/825 |
| 5,526,515 | 6/1996 | Ross et al. | 395/550 |
| 5,530,846 | 6/1996 | Strong | 395/550 |

OTHER PUBLICATIONS

*Improved Algorithms for Synchronizing Computer Network Clocks*, by David L. Mills, IEEE/ACM Transactions of Networking, vol. 3, No. 3, Jun. 1995.

*Primary Examiner*—Dennis M. Butler
*Attorney, Agent, or Firm*—Townsend and Townsend and Crew LLP

[57] ABSTRACT

A computing system develops time/date values by using a free-running counter to measure and accumulate increments of time. The increments of time are converted from the resolution of the free-running counter to that used for the time and date values by dividing by a conversion variable and then used to update the time/date value. The accuracy of the time/date value is monitored by periodically comparing the rate of the free-running counter to the rate of a more accurate, external clock. The ratio of these two rates is used to adjust the conversion variable. The conversion variable reflects any differences between (1) the rate of change of the increments of time used for developing the time/data value and (2) the external clock. Its use here, therefore, will operate to either slow down or speed up the rate of change of the time/date value so that it more closely tracks the external clock.

14 Claims, 3 Drawing Sheets

METHOD FOR KEEPING ACCURATE TIME IN A COMPUTER SYSTEM

BACKGROUND OF THE INVENTION

The present invention relates generally to timekeeping in data processing systems, and particularly to a method of timekeeping that employs an external clock system to synchronize clock values maintained by the processing system to the external clock without resetting or otherwise disruptively modifying any internal clock values.

Most, if not all, computer systems employ some type of timekeeping function to produce accurate time and (calendar) date values. Such time/date values are typically used, for example, to time-stamp the occurrence of events, measure interval durations between events, "stamp" files with dates and time of creation or revision, and the like. While some mission critical, real-time computer systems utilize dedicated, highly-accurate (and often costly) crystal oscillators to generate the necessary clock values used for timekeeping functions, general purpose computing and data processing systems more often rely upon the system's master crystal oscillator for timekeeping implementation.

Some computing systems may have specially-designed, dedicated timekeeping circuits that, using periodic signals produced by or derived from the system's master oscillator, produce therefrom date/time values. However, such dedicated timekeeping circuits tend to increase the manufacturing expense, as well as the circuit cost (e.g., taking space that can be used by other circuitry), of the system.

Much of the present computing and data processing system designs employ off-the-shelf high-performance microprocessors. Fortunately, many such high-performance microprocessors include an internal, free-running counter for providing periodic interrupts, to initiate task-switching, or to trigger other periodic functions. (The R4000/4400 series of microprocessors from MIPS Computer Division of Silicon Graphics is but one example of such a microprocessor.) This free-running counter may be (and often is) also used to form the basis of timekeeping functions implemented in just a few lines of software (e.g., the operating system code). Typically driven by the system's master clock signal, or a derivative of the master clock signal, the content of the counter is read at two different moments of time, producing a time difference that is indicative of the passage of time. These time differences are accumulated, for example in memory, as a variable and can be used to create time and date values. For example, if a present reading of the counter produces the value COUNT, while the earlier read value is $COUNT_{last}$, the accumulation of differences, here termed CLKBASE, may be created and periodically updated by the assignment statement:

$$CLKBASE := CLKBASE + (COUNT - COUNT_{last})/K \qquad (1)$$

where K is a conversion constant that converts the resolution of the counter to that desired for CLOCK (typically, 1 microsecond). Conversion is needed because often the counter is incremented with an available high-frequency signal with a resolution (period of incrementation) much smaller than needed or desired. Thus, for example, if the counter is incremented with a 75 Mhz clock signal, (with a 0.0133 microsecond period or resolution) but timekeeping requires a 1 microsecond resolution, the conversion constant, K, used in the assignment statement 1, above, would be 75. A time stamp value may be produced by adding to a present value of CLKBASE an offset to produce, for example, a local time and calendar date. The offset may be the time and date the computing system was first brought up and put on line, or it may be some other value.

The CLKBASE value may be updated each time a time stamp value is requested (e.g., by a client process running on the processing system). At a minimum, the CLKBASE value need only be updated at least once before the counter runs through its maximum number of states. Thus, for a 32-bit counter (often the size of such counters), the value of that counter must be read at least once every $2^{32}$ states attained by the counter in order to avoid a loss of time due to an overflow of the counter.

This technique of maintaining time/date timekeeping functions works well, but suffers somewhat from a lack of accuracy, even when using crystal oscillators. For example, a master crystal oscillator operating at 150 Mhz (typical in a high-performance system) may have specified accuracy of (+/−) 75ppm which translates to a worst case drift rate of 6.48 seconds for a 24 hour period. Such a high drift rate is not acceptable for those applications that may require synchronization with the external world, or operate in a wide area network.

Techniques for maintaining timekeeping accuracy have included using an external clock mechanism to periodically reset or modify a timekeeping value such as CLKBASE in the timekeeping description present above. However, this can result in negative time, i.e., producing such inconsistencies as two successive timestamps giving an indication that time is going backwards.

Distributed multiple-processing systems often approach timekeeping accuracy by taking the position that while some master oscillators of certain of the processors of the system may run faster than others, their cumulative average frequencies is acceptably close to nominal. Accordingly, timekeeping values are gathered from the processors of the system by one (the "Reference") processor. The Reference processor determines the average, and distributes the newly-determined average to the other processors who use it to reset or modify their timekeeping values. Besides the overhead involved, the resetting or modifying of local timekeeping values using the distributed average, may still result in discontinuities in timekeeping, or worse yet, negative time.

Accordingly, there is needed a technique to provide an accurate processor clock value that minimizes drift, and is synchronized to an external world value.

SUMMARY OF THE INVENTION

The invention provides a processing system a simple, yet effective, method of maintaining an accurate timekeeping value for use with those processing systems that employ a free-running or similar counter to implement timekeeping functions. The invention is directed to making periodic adjustments to the rate at which time is kept rather than modifying time itself. The rate adjustments are determined by periodic comparisons of the processor's timekeeping rate to that of an external clock.

Broadly, the present invention performs adjustments of the processor's timekeeping by replacing the conversion constant K of the assignment statement 1, above, with a variable M. Initially, M is developed by the relationship f*RES, where f is the frequency of the signal that increments the free-running counter used for timekeeping, and RES is the timekeeping resolution desired. An external clock, having an accuracy better than that realizable by the processor's timekeeping, is provided. The external clock is periodically sampled to produce passages of time that are compared to the same passages of time as measured by the timekeeping operation of the processor, using the free-running counter. If it appears that the processor's timekeeping is faster than that of the external clock, the variable M is increased proportionately. When the variable M is then used (as a replacement for the conversion constant K in the assignment statement 1, above) the timekeeping rate is slowed accordingly. Conversely, if the comparison results in finding the external clock rate to be faster than the processor's timekeeping, the conversion variable M is proportionately decreased to introduce an increase in the timekeeping rate of the processor—until the next comparison.

In a preferred embodiment of the invention, a value CLKBASE, is stored in memory, and used to accumulate time from some predetermined initialization value, or by presetting it to the value of the external clock. At the same time, the processor's free running counter is sampled and saved a variable $COUNT_{last}$. Thereafter, when the variable CLKBASE is subjected to a periodic update, a new value of CLKBASE is created according to the relationship:

$$CLKBASE := CLKBASE + (COUNT - COUNT_{last})/M \quad (2)$$

The value of CLKBASE to the right of the assignment symbol (:=) is retrieved from memory for use in the relationship (2); it is the value of CLKBASE when last updated according to that relationship. M is the variable used to convert from the resolution of the free-running counter to that desired for CLKBASE. In addition, if one of more samples of the external clock have been made, the conversion variable M will reflect any noted differences between the rates change of the CLKBASE and the external clock, operating to adjust the rate of change of CLKBASE to more closely track that of the external clock.

The conversion variable M is developed by comparing, at two moments in time, the values of the external clock and the CLKBASE value. That is, at a first moment in time the value of the external clock and the value of the CLKBASE are developed and saved. At some second, subsequent moment in time the two values are again sampled. The earlier values of the external clock and the CLKBASE are subtracted from the later values, and two differences, reflecting as they do rates of change, are compared to determine whether the processor's timekeeping is faster or slower than the external clock. The conversion variable M, then, is modified by multiplying a previous value of M by the ratio of the two differences, indicating the proportional adjustment of CLKBASE to bring it into line with the external clock value.

Recognizing that the initial value of CLKBASE may have a small initial offset from the external clock due to inherent delays in reading the external clock value, a further embodiment of the invention operates to remove this offset by intentionally modifying the values of M in a second way. This modification is effected by modifying the difference in time between two calculations of M by a value indicative of the drift of the CLKBASE value relative to the external clock value.

In addition, due to inherent delays in reading the external clock value, updates are not instantaneous, and instabilities in the frequencies of the crystal oscillators must be considered. Accordingly, the calculation for the conversion variable, M, includes a factor that modifies the drift value. Although the factor could be empirically developed over time, any positive, non-negative integer greater than 1 can be used. According to the present invention, the factor used is the integer 2.

A number of advantages are achieved by the present invention. First is that the timekeeping maintained by the present invention no longer relies upon the accuracy of the master oscillator of the processing system, but on an external mechanism that can be more accurate.

A second advantage is that accuracy is maintained not by modifying time values, but by modifying the rate at which time values are created. This prevents discontinuities from appearing in time values.

These and other advantages and features of the present invention will become apparent to those skilled in this art upon a reading of the following detailed description, which should be taken in conjunction with the accompanying drawings.

DESCRIPTION OF THE PREFERRED EMBODIMENT

Figure 1:
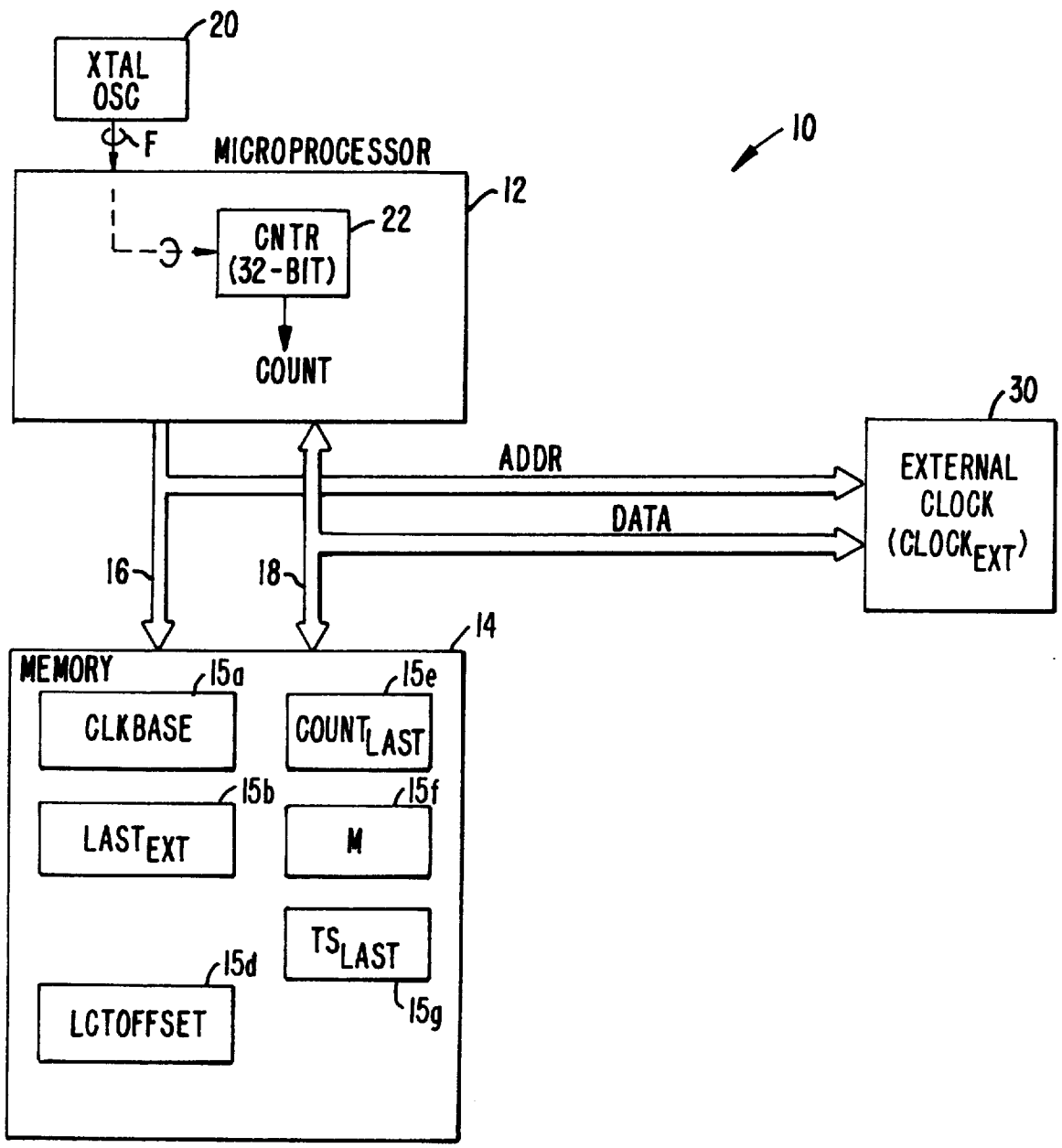
FIG. 1 is a diagrammatic representation of a processing system implementing the timekeeping method of the present invention.

Referring now to FIG. 1, illustrated in simplified form is a processing system, designated generally with the reference numeral 10, structured to implement and use the present invention. As FIG. 1 shows, the processing system 10 includes a processing element in the form of a microprocessor 12 connected to a memory system 14 by address and data bus lines 16, 18, respectively. A crystal oscillator 20 produces a periodic clock signal F that is applied to the microprocessor 12 for synchronous operation. The clock signal F, or a derivative thereof, is applied to a 32-bit, free-running counter 22, incrementing the counter 22.

Counter 22 produces a counter value, COUNT, that is periodically sampled and used by the microprocessor 12 for timekeeping functions.

Timekeeping includes using the COUNT value obtained from the counter 22 to periodically update a value (CLKBASE) stored in memory 14 (at memory location 15a), or to create "time-stamp" (TS) values (that include CLKBASE) indicative of local time and date when requested by a client process. Usually, only local time/date values are desired, but since TS values are developed using an offset (LCTOFFSET) to adjust for whatever time and date are desired, changing or using another offset produces other time/date TS values (such as Greenwich Mean Time (GMT)).

The value of CLKBASE kept in the memory 14 should be updated at least once every $2^N$ counts of the free-running counter 22, where N is the size of the counter (here, 32 bits). For example, if the free-running counter 22 is incremented (counted) at a 75 MHZ rate, and with a counter (as here) that is 32 bits wide, then the value of CLKBASE must be updated at least once every 57.27 (approx.) seconds ($2^{32}/(7.5 \times 10^6)$).

Continuing with FIG. 1, the microprocessor 12 is provided with access to the external clock 30 via the address and data lines 16, 18, although it will be evident to those skilled in this art that other access means can be used. The external clock produces a clock value (CLOCK$_{ext}$) that is periodically sampled and, according to the present invention, used by the microprocessor 12 to adjust the value of the conversion variable M. The value CLOCK$_{ext}$ may be local time or of any other time zone—GMT for example. As will be seen, the particular form of the value of CLOCK$_{ext}$ is immaterial to the present invention. Whatever form it may take can be accounted for by an appropriate offset value when the TS value is created.

FIG. 1 shows the memory 14 as including memory locations 15 for storing various values used by the microprocessor 12 in its timekeeping operations to be described. Thus, stored at memory location 15a is the most recent value of CLKBASE; memory location 15b keeps LAST$_{ext}$, the last sampled value CLOCK$_{ext}$ from the external clock 30; memory location 15d retains LCTOFFSET, the offset used to provide a TS time/date value in local time; the value COUNT$_{last}$, stored at memory location 15e, is the value of the counter 22 obtained when CLKBASE was last updated. The memory location 15f maintains the conversion variable, M. Finally, the memory location 15g keeps the last timestamp value (TS$_{last}$).

Figure 2:
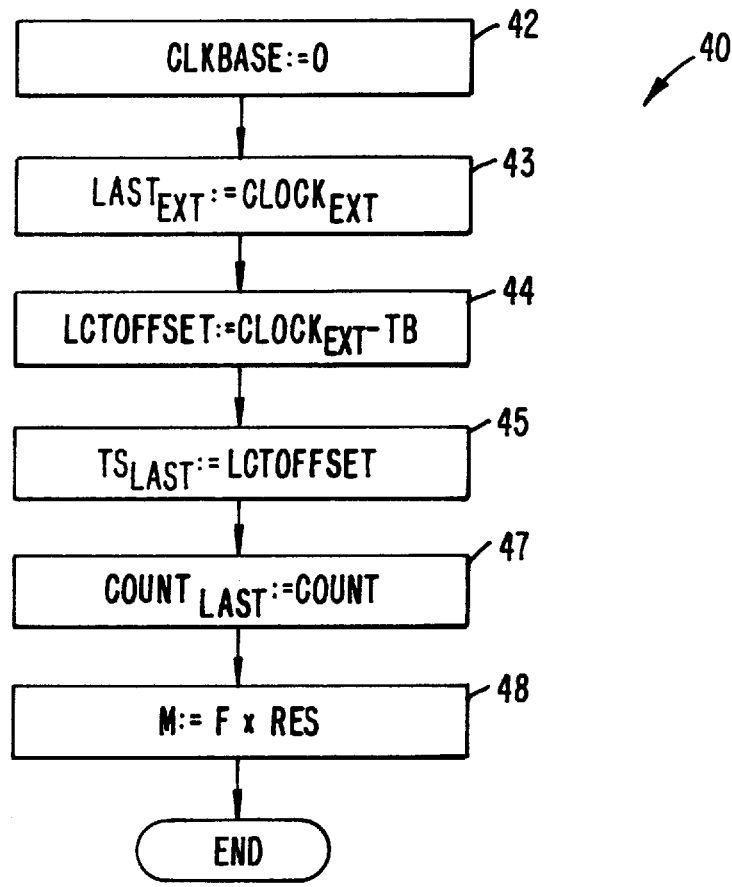
FIG. 2 is a flow diagram, illustrating initialization procedure employing an external clock value to establish initial values used in the timekeeping method of the present invention.

The procedure for initializing certain of the timekeeping values, notably CLKBASE, LCTOFFSET, and M, is illustrated in FIG. 2. The procedure, designated generally with the reference numeral 40, is used only when the system 10 is first brought on-line, or back on-line if earlier brought down for repair. The procedure 40 begins, at step 42, with the CLKBASE value being set to zero. Next, in step 43, the value of the external clock 30, CLOCK$_{ext}$ is read, and assigned to the variable LAST$_{ext}$. As will be seen, LAST$_{ext}$ is used in updates of the conversion variable M to determine how much time has passed, in terms of time kept by the external clock 30, since the last update of M.

In step 44, the offset value, LCTOFFSET, used to convert to local time (or any other date/time desired) is created by subtracting from the CLOCK$_{ext}$ value an arbitrary time base (TB) value, defined as midnight (12:00 am) Jan. 1, 1975. At step 45, the value LCTOFFSET, as now initialized by step 44, is assigned to a timestamp value TS$_{last}$ that will form the basis for development of future timestamp values when called for—as will be described below.

Step 47 initializes the COUNT$_{last}$ value in memory 14 by reading the then present value (COUNT) of the free-running counter 22 and assigning that present value to COUNT$_{last}$.

Finally, at step 48, an initial value of the conversion variable M is calculated. Knowing the frequency F used to increment the counter 22, and the resolution (RES) of the timekeeping desired (i.e., the desired resolution of timestamps produced by the microprocessor 12—for example 1 microsecond), an initial value of the translation variable M is established by the product of those two values. Thus, for example, if the frequency F is 150 Mhz, and the desired resolution 1 microsecond, M is initially set at 150.

These initialized values, CLKBASE, LAST$_{ext}$, LCTOFFSET, COUNT$_{last}$, M, and TS$_{last}$ are stored at their respective memory locations, 15a, 15b, 15d, 15e, 15f, and 15g.

Figure 3:
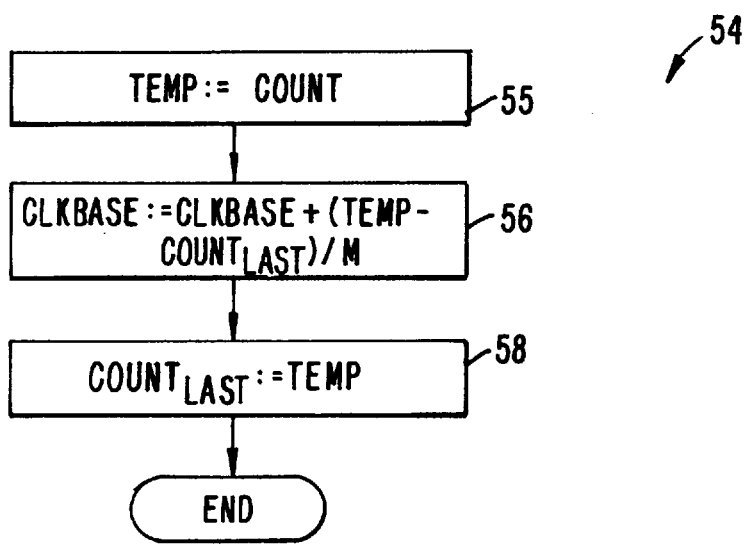
FIG. 3 is a flow diagram of the periodic procedure used to update of the CLKBASE variable.

CLKBASE is updated by the procedure 54 shown in FIG. 3—first using these initial values, and thereafter using updated versions of the values. The update procedure 54 begins with step 55 in which the present value (COUNT) of the counter 22 is obtained and assigned to TEMP. Then, at step 56, CLKBASE is updated by adding to it an amount indicative of the passage of time, as measured by the counter 22 since the last update, or initialization, of CLKBASE. Thus, in step 56 the microprocessor 12 subtracts from the present value of the free-running counter 22 (now held by TEMP) the COUNT$_{last}$ value which is retrieved from memory 14. The resultant difference is indicative of the time elapsed since CLKBASE was last updated, but in the resolution of the free-running counter 22. Dividing by the conversion variable M converts the resultant difference to time of the desired resolution (e.g., microseconds) which is added to the CLKBASE value. That sum, the present value of CLKBASE, is returned to the memory 14. Thus, as can now be seen, the CLKBASE value is the accumulation of time, in microseconds, since initialization.

The procedure 54 concludes at step 58 with the assignment of TEMP to COUNT$_{last}$ for use the next update of CLKBASE. Thus, in step 58, the value of the free-running counter 22 obtained in step 56 (i.e., COUNT) is stored at the memory location 15e as COUNT$_{last}$.

Updates of CLKBASE must occur with sufficient frequency to keep the difference between two successive COUNT values from exceeding the maximum value attainable by the counter 22. Since counter 22 is a 32-bit counter, it can attain $2^{32}$ distinct states from (and including) 0 to $2^{32}-1$. As long as CLKBASE is updated before the difference between any two successive values of COUNT exceeds $2^{32}$, and using unsigned arithmetic, there will be no overflow problem.

Figures 4, 5:
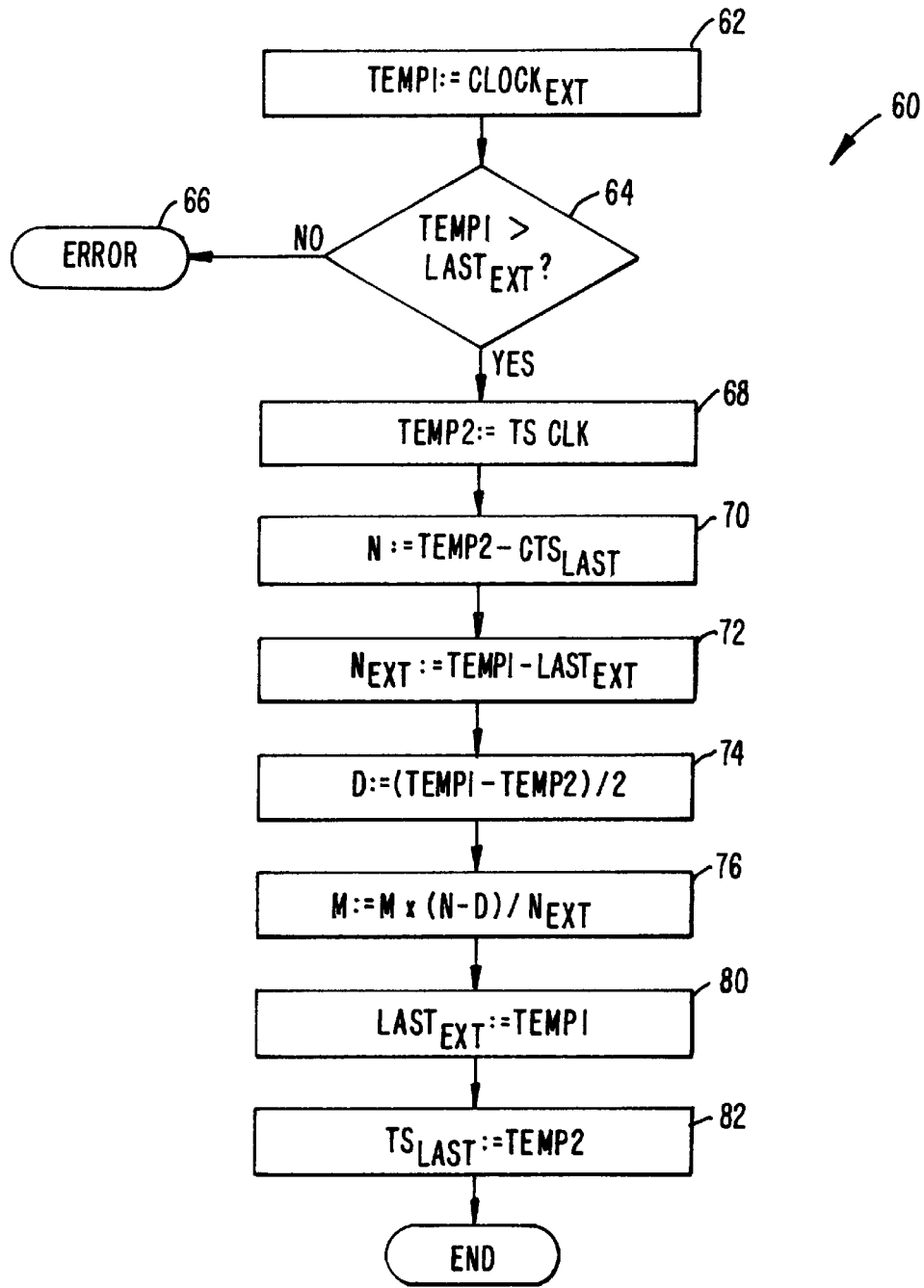
FIG. 4 is a flow diagram illustrating the method used to produce a time-stamp value.
FIG. 5 is a flow diagram illustrating the method used, according to the present invention, to update the conversion variable, M.

When a time stamp value (TS) is requested, the microprocessor 12 executes the time-stamp generation procedure identified by the reference numeral 50 and illustrated in FIG. 4. Step 52 sees the microprocessor 12 creating the requested TS value by first retrieving the values CLKBASE, LCTOFFSET, COUNT$_{last}$, and M from the memory 14, and accessing the counter 22 for a COUNT value. The prior access of the counter 22, which was saved (and now retrieved) as COUNT$_{last}$, is subtracted from COUNT to provide a time value in the resolution of the counter 22. Thus, that time value is divided by the translation variable M. The result is summed with CLKBASE and LCTOFFSET to produce TS, a value indicative of local time and date.

Referring now to FIG. 5, the procedure 60 illustrates the step taken to adjust the conversion variable M for synchronizing the generated time stamp values produced by the microprocessor 12 to the external clock 30. The procedure 60 is based upon comparing the amount of time accumulated by CLKBASE to that accumulated by the external clock 30 over the same period. That comparison results in a ratio indicative of the rate of change of the CLKBASE value relative to the rate of change of the external clock 30 and an adjustment of the conversion variable M accordingly. For example, if the rate of change of CLKBASE is found to exceed that of the external clock 30, procedure 60 produces a value of M larger than that previously used. Subsequent values of CLKBASE and TS as developed by procedures 54 and 50 (FIGS. 3 and 4) will show a rate of change downward toward that of the external clock.

As will be discussed further below, the CLKBASE value (and, therefore TS) can develop an offset relative to the actual value of the external clock 30. If the ratio developed by the procedure 60 were to compare only time intervals and not actual time values, offset in CLKBASE would be left unaffected. Thus, M is adjusted by a "drift" factor (D) that does compare the actual values of CLKBASE and the external clock to substantially remove any offset from CLKBASE.

Turning now to FIG. 5, the procedure 60 begins, at step 62, with the microprocessor 12 obtaining the present value of the external clock 30, $CLOCK_{ext}$, and assigning that value to TEMP1.

At step 64, the value of TEMP1 is compared to an earlier sampled value of the external clock 30, stored at memory location 15*b* as $LAST_{ext}$. If the present value of the external clock 30 is not greater than the earlier sampled value, an error has occurred (e.g., an external clock 30 malfunction) and, accordingly, routine 60 is exited at 66.

If, however, the present value of the external clock 30 is greater than its last sampled value, the routine 60 will proceed to step 68 where a present timestamp (TS) is created (using procedure 50 of FIG. 4) and assigned to TEMP2.

Next, at step 70, a value $TS_{last}$ (the timestamp (TS) created at the time of the last update of M) is subtracted from TEMP2, producing a value indicative of a time period T in terms of the timekeeping function of the microprocessor 12. Then, the result is assigned to N. Similarly, in step 72, a value $N_{ext}$ is assigned the difference between the present value of the external clock 30, as represented by TEMP1, and an earlier value of the external clock, $LAST_{ext}$ obtained when M was last updated. As is N of step 70, the $N_{ext}$ of step 72 is a measure of the time period T in terms of value of the external clock 30. (The resolution of the external clock 30 may or may not be the same as that of CLKBASE. If not, the value of the external clock will need to be converted to the resolution of CLKBASE before it is put to use.)

The value developed by step 74 operates to make two corrections: (1) an initial offset between the internal clock value of the processor 12 (i.e., TS) and the that of the of the external clock 30, and (2) accumulated errors that can occur overtime as the result of irregularities that can occur in obtaining the external clock value. The former results from the fact that except for the correction factor developed in step 74, the periodic comparisons of the processor's internal clock (represented by TS) to the external clock are not comparisons of the actual values of those clocks, but time intervals. Thus, if initially there is developed an offset in one over the other, that offset will remain because it is the rate of the internal clock that is being adjusted by comparing intervals, not the comparison of the actual values of the processor internal and the external clocks. The second correction is necessitated by the fact that there may be irregularities in obtaining the external clock value. For example, assume that such a delay resulted in an external clock value slightly larger than it should be. This would result in an adjustment in the conversion variable, M, downward, allowing the CLKBASE value to drift upwards until the next update of M (by procedure 60). The next update will notice the error (which will show up as the internal clock running faster than the external clock), and compensate by enlarging M to bring down the rate at which the CLKBASE value changes. However, there will be damage to CLKBASE that will never be corrected because, as noted above, only the rates of change of the internal clock and the external clock are being compared, not the actual values.

However, it is possible to remove these offsets and error accumulations by developing a value in step 74 that is indicative of the "drift" between the internal clock (i.e., the CLKBASE value) relative to that of the external clock 30 at the time of update (and since the last update). Thus, this drift value D is defined, in terms of the assignments made thus far in procedure 60, by:

D=(TEMP1−TEMP2)/Q. Accordingly, step 74 creates a temporary value, D,and assigns to that value the difference between TEMP1 (representing the present value of the external clock 30) and TEMP2 (representing the present value of the timebase, TS) divided by Q where Q is 2. (The selection of the value of 2 for Q is somewhat arbitrary. Higher values will correct errors more slowly, but minimize oscillation; lower values correct errors more slowly, but with additional oscillation.) Remember, as discussed above, that the drift value D is used to account for various inherent delays; any potential oscillations in D are damped by dividing it by the value Q. While the value of Q can be empirically developed, any value greater than 1 can be used. Thus, the integer 2 is selected. Note also that actual values of the clocks are used to form a difference: TEMP1 (to which was assigned the value of external clock 30 in step 62) and TEMP2 (which is assigned the present value in the internal clock in terms of TS in step 68). The difference is any offset or accumulated errors between the two clocks.

Step 76 adjusts the value of the conversion variable, M, by multiplying an earlier value of the conversion variable (the result of the last update, using this procedure 60, or the initialized value) by the value N from step 70, adjusted by the drift value D and divided by $N_{ext}$. This updated conversion variable M value is then returned to the memory 14 and stored at memory location 15*f*. The updated conversion variable value is used for all later calculations of a time stamp value (TS) per the procedure 50 (FIG. 4), and for updates of CLKBASE, per procedure 54 (FIG. 3).

The update routine 60 concludes with some housekeeping steps: step 80 assigns the present sampled value of the external clock 30, TEMP1 (i.e., $CLOCK_{ext}$) to the value $LAST_{ext}$, and stores it at memory location 15*b* of the memory 14. The next update of M will use this value of $LAST_{ext}$ in step 64 and 72. Step 82 sees the present value of TS, represented by the temporary value TEMP2, assigned to $TS_{last}$ and stored in memory 14 for use the next time procedure 60 is used to adjust the translation variable M.

Preferably, the translation variable update routine 60 is performed every T seconds, where T is large enough so that the resolution of the external clock 30 does not contribute significantly to the inaccuracy of the value of CLKBASE or the values of TS as generated by the microprocessor 12. Thus, for example, where the external clock 30 may have a resolution of one second, T might preferably be something on the order of 55 hours.

In summary there has been disclosed a method, and a computing system for implementing that method, of maintaining the accuracy of time and date time-stamp values. It will be evident to those skilled in this art, however, that the invention can be modified to fit other implementations. For example, there may be need for operator adjustment of the time-stamp values such as to change the time and date to account for daylight saving changes or other changes. In this instance, the memory 14 could store another variable, ADJUSTMENTS.TIME, which would be included in the assignment statement 52 used to produce time/date values in the same manner as the offset value LCTOFFSET. Any adjustments (i.e., additions or subtractions of time) introduced by an operator would be added to or subtracted from, as the case may be, the variable ADJUSTMENTS.TIME stored in the memory 14. When a time-stamp (TS) is requested, ADJUSTMENTS.TIME would be added to CLKBASE in step 52 of the procedure 50 (FIG. 4) so that the result would reflect any and all adjustments to time and date applied by an operator.

Additionally, it should now be evident that nothing is required of whatever is used as an accuracy reference, i.e., here the external clock 30, other than it should be more accurate (or expected to be more accurate) than the clock whose accuracy is being improved by the present invention. Precision, for example, is relatively unimportant, and need not even be comparable to that of clock being improved. The only role played by precision in the present invention concerns the rate at which the reference can be sampled. Those skilled in this art will recognize that a more precise reference can be sampled with greater frequency than a reference with less precision, in turn allowing the conversion factor, M, to be adjusted more frequently. ("Precision," as used here, refers to how finely two consecutive events in time can be marked by the clock or reference. This is also often referred to as "resolution.")

Further, the particular device used as the reference need only be expected to provide an accuracy greater than that of the timekeeping being improved. For example, the "external clock" or reference may take the form, in a network of computers, of a value derived from an average value of several or all of the computers in the network. Another example may be that the network is composed of several different types of computers, some with "clocks" more accurate than others. In this case, those computers with less accurate clocks can use the more accurate clock of other computers in the network as the reference or external clock.

What is claimed is:

1. A method for maintaining the accuracy of a processor clock value according to an external clock value, the method including the steps of:

creating a rate variable that is proportional to a ratio of a chance of the processor clock value over a time period to a change of the external clock value over the time period;

developing an updated rate variable from a ratio of a first difference between a present processor clock value and a last processor clock value and a second difference between a present external clock value and a last external clock value multiplied by the rate variable;

saving the present external clock value as the last external clock value;

saving the present processor clock value as the last processor clock values saving the updated rate variable as the rate variable; and periodically incrementing the processor clock value with a time value that is proportional to a passage of time since last incrementing the processor clock value modified by the rate variable.

2. The method of claim 1, wherein the processor clock value is initially equal to the external clock value.

3. The method of claim 1 wherein the processor clock value is incremented at a frequency greater than the rate variable is updated.

4. The method of claim 1, wherein the creating step includes the rate variable being initially produced by multiplying the predetermined rate by a desired processor clock resolution.

5. The method of claim 1, wherein the time value is provided by a digital counter operating at a first frequency, and wherein the rate variable is used to translate the first frequency to a second frequency.

6. The method of claim 1, wherein the developing step includes subtracting a third difference between the present processor clock value and the present external clock value divided by a constant from the first difference.

7. A method of maintaining accuracy of a time value in a processor for producing therefrom a date/time value, the method including the steps of:

providing a reference clock value;

periodically using the reference clock value to form a ratio from a change of the reference clock value and a change of the time value over a time period;

incrementing the time value to produce an updated time value by adding to the time value a count that is indicative of a passage of time multiplied by the ratio; and saving the updated time value as the time value.

8. The method of 7, wherein the processor includes a counter for maintaining a count value, and wherein the processor operates to obtain the count value from the counter at periodic moments in time.

9. The method of claim 8, wherein the counter is of a different time resolution than that of the time value, and wherein the incrementing step includes multiplying the ratio with a conversion factor to convert from time resolution of the counter to time resolution of the time value.

10. The method of claim 7, wherein the step of periodically using the reference clock value is preceded by the step of initializing the time value using the reference clock value as an initial time value.

11. A method of maintaining an processor clock, including the steps of:

providing a present reference clock value and a prior reference clock value;

obtaining a present processor clock value and a prior processor clock value;

creating a correction factor that includes the ratio of a first difference between the present reference clock value and the prior reference clock value and a second difference between the present processor clock value and the prior processor clock value;

incrementing the present processor clock value with a count indicative of a passage of time multiplied by the correction factor to produce an updated processor clock value; and saving the updated processor clock value as the prior processor clock value.

12. The method of claim 11, wherein the creating step includes subtracting from the first difference a third difference between the present reference clock value and the present processor clock value.

13. The method of claim 12, wherein the creating step includes multiplying the third difference by a constant before subtracting from the first difference.

14. The method of claim 13, wherein the constant is ½.

* * * * *